United States Patent [19]
Hölzel et al.

[11] Patent Number: 6,039,072
[45] Date of Patent: Mar. 21, 2000

[54] SAFETY VALVE ARRANGEMENT

[75] Inventors: Folkhard Hölzel, Lauenhagen; Manfred Kramer, Barsinghausen; Jens Tiedemann, Gehrden, all of Germany

[73] Assignee: WABCO GmbH, Hannover, Germany

[21] Appl. No.: 08/882,241

[22] Filed: Jun. 25, 1997

[30] Foreign Application Priority Data

Jul. 1, 1996 [DE] Germany ................. 19626324

[51] Int. Cl.$^7$ ................................................. F16K 15/00
[52] U.S. Cl. ................ 137/512.3; 137/513; 137/516.27; 137/543.17
[58] Field of Search ................ 137/512.3, 513, 137/516.27, 540, 543.17, 543.21, 512, 535

[56] References Cited

U.S. PATENT DOCUMENTS

| | | | |
|---|---|---|---|
| 2,178,901 | 11/1939 | Webster | 137/513 |
| 2,713,874 | 7/1955 | Sundstrom | 137/513 |
| 4,007,758 | 2/1977 | Gray et al. | 137/543.17 |
| 4,637,430 | 1/1987 | Scheffel et al. | 137/543.21 |
| 4,738,282 | 4/1988 | Boehringer | 137/512.3 |
| 4,953,588 | 9/1990 | Sands | 137/512 |
| 4,964,423 | 10/1990 | Gausman et al. | 137/543.17 |

*Primary Examiner*—Denise L. Ferensic
*Assistant Examiner*—Joanne Y. Kim
*Attorney, Agent, or Firm*—Proskauer Rose LLP

[57] ABSTRACT

A safety valve arrangement for an installation operating with a pressure medium has a pressure medium input and a pressure medium output connected by a valve. The valve comprises a valve seat and a valve closing element. The valve closing element is moveable between an open position and a closed position and has an active surface that is subjected to the pressure medium in the opening direction of the valve. The valve closing element also has an auxiliary surface that is subjected to the pressure medium in the opening direction of the valve only when the valve closing element is lifted from the valve seat. A spring arrangement holds the valve closing element closed and the valve closing element moves from a closed position to an open position when the pressure medium acting upon the valve closing element is greater than the opposing force of the spring arrangement acting upon the valve closing element. The safety valve also has an auxiliary valve which also connects the pressure medium input to said pressure medium output. The auxiliary valve is moveable from an open position to a closed position. The spring arrangement also holds the valve closing element of the auxiliary valve closed. The valve closing element of the auxiliary valve is opened when the force of the pressure medium acting upon the valve closing element is greater than the opposing force of the spring arrangement acting upon the auxiliary valve closing element. The safety valve arrangement may also have a choke located between the valve and the pressure medium output which throttles the flow of the pressure medium.

23 Claims, 6 Drawing Sheets

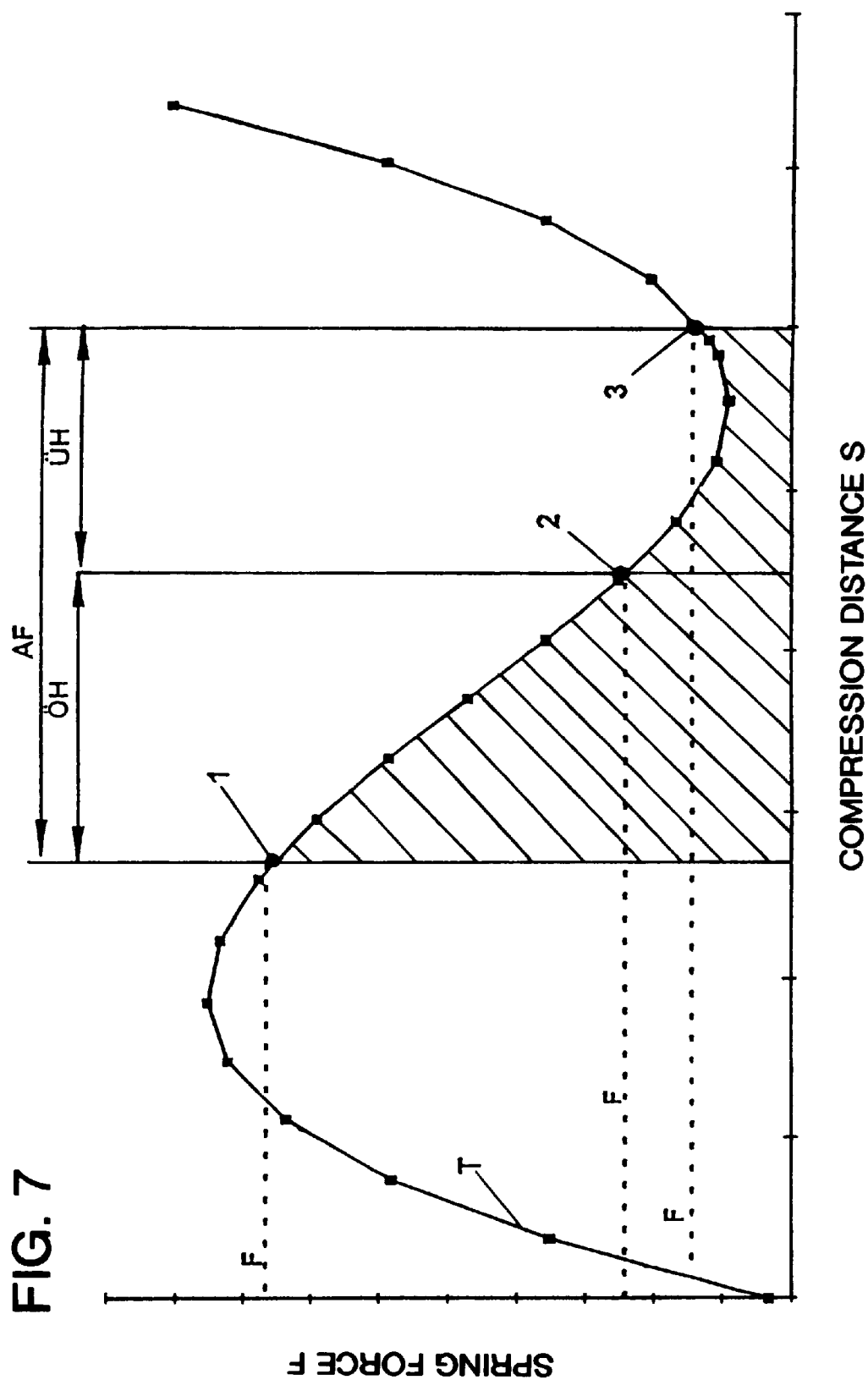

SAFETY VALVE ARRANGEMENT

BACKGROUND OF THE INVENTION

The present invention relates to a safety valve arrangement for an apparatus operating with a pressure medium having a pressure medium input and a pressure medium output which are connected to each other by a valve. The valve has a valve seat and a valve closing element which can be moved towards and away from the valve seat. The valve closing element is held by a spring arrangement and goes from a first end position to a second end position in which the valve is open when the force of the pressure medium acting upon the valve closing element overcomes the opposing force of the spring arrangement acting upon the valve closing element.

A safety valve arrangement of this type is known from EP 0 357 420 B1 (U.S. Pat. No. 4,856,555).

The known safety valve arrangement has a housing with a pressure medium input and a pressure medium output. The pressure medium input and the pressure medium output can be shut off from each other by a valve. The valve comprises a valve seat and a valve closing element moveable relative to the valve seat. The valve closing element is held by a Belleville spring washer in a first end position in which the valve is closed. The closing element goes to a second end position in which the valve is open when the force of the pressure medium acting upon the valve closing element overcomes the opposing force of the Belleville spring washer acting on the valve closing element.

In a safety valve arrangement of this type, the opening of the valve occurs in a creeping fashion. This means that the valve closing element is pushed at a relatively slow pace by the pressure building up in the pressure medium input away from the valve seat in the opening direction of the valve. It is possible that sufficient pressure may not build up in order to bring the valve closing element completely into the open position. A small gap between the valve seat and the valve closing element may result in a "creeping permeability." If such a safety valve arrangement is used in a compressed-air supply system containing a compressor, the permeability may lead to charring at the valve seat and thereby to interference with the safety valve arrangement. For example, charring at the valve seat may be produced by the deposit of oil particles present in the compressed air, or by temperature-dependent changes in the oil-moistened valve surfaces.

Combination of the known safety valve arrangement described above with a compressor may have the result that although the valve closing element may briefly reach its open position when a predetermined pressure level has been exceeded, it does not remain in its open position due to pressure fluctuations at the pressure medium input of the safety valve arrangement. These fluctuations may be caused by pressure pulsations.

It is therefore an object of the present invention to provide a safety valve arrangement of the type initially mentioned, wherein the valve is brought rapidly and completely into its open position when a certain pressure has been exceeded.

SUMMARY OF THE INVENTION

It is the object of the present invention to develop a safety valve arrangement for an installation operating with a pressure medium having a pressure medium input and a pressure medium output. A valve is located between the pressure medium input and pressure medium output and comprises a valve seat and a valve closing element. The valve closing element is moveable between an open position and a closed position and has an active surface which is subjected to the pressure medium in the opening direction of the valve. The active surface constitutes an area of the valve closing element that is delimited by the valve seat.

The valve closing element also has an auxiliary surface located on an area of the valve closing element outside the area of the valve closing element which is delimited by the valve seat. The auxiliary surface is subjected to the pressure medium in the opening direction of the valve only when the valve closing element is lifted from said valve seat.

A spring arrangement holds the valve closing element in a first end position wherein the valve is closed. The valve closing element moves from the first end position to a second end position wherein the valve is open when the force of the pressure medium acting upon the valve closing element is greater than the opposing force of the spring arrangement acting upon the valve closing element.

An auxiliary valve connects the pressure input to the pressure output and is moveable from an open position to a closed position. The auxiliary valve has a bore for receiving the pressure medium and a valve closing element positioned so as to control the pressure medium through the bore. The auxiliary valve is located between the valve and the pressure medium output.

The spring arrangement also holds the valve closing element of the auxiliary valve in a first end position wherein the auxiliary valve is closed. The auxiliary valve closing element moves from a first end position to a second end position wherein the valve is open when the force of the pressure medium acting upon the valve closing element of the valve is greater than the opposing force of the spring arrangement acting upon the auxiliary valve closing element.

Both the valve closing element of the valve and the valve closing element of the auxiliary valve are configured so that the auxiliary valve opens later than the valve and the auxiliary valve closes before the valve.

In another embodiment is further equipped with a choke located between the valve and the pressure medium output of the safety valve arrangement which throttles the flow of the pressure medium from the pressure medium input to the pressure medium output when the valve is in the open position.

Due to the greater overall active surface on the valve closing element, the force exerted by the pressure medium on the valve closing element is just as high when the pressure of the pressure medium is lower, and can even be higher than the force exerted by the pressure medium on the valve closing element when the valve is closed and the pressure medium acts only upon the first active surface of the valve closing element. This effect is further enhanced by providing an auxiliary valve which reaches its open position later than the valve between the valve and the pressure medium output of the safety valve arrangement. The auxiliary valve of the valve closing element causes the pressure medium to accumulate in the space in which the valve closing element of the valve is located, so that brief pressure fluctuations at the pressure medium input of the safety valve arrangement do not effect the opening process of the valve negatively.

The same positive effect can also be achieved, by providing a choke between the valve and the pressure medium output of the safety valve arrangement to choke the out flowing pressure medium flow when the valve is open.

If the safety valve arrangement is provided with an adjustable stop for the valve closing element, the stroke of the valve closing element can be limited so that the valve closing element returns back to its starting position automatically once the pressure at the pressure medium input of the safety valve arrangement has again decreased to a predetermined value for a predetermined minimum period of time.

If the spring arrangement acting upon the valve closing element is one in which the force vs. distance characteristic line at least partially has a negative slope, the sudden opening of the valve is advantageously assisted.

BRIEF DESCRIPTION OF THE DRAWINGS

FIG. 7 shows a spring-force diagram of the course of the force of the Belleville spring washer during the opening and the closing process of the valve or of the two valves of the safety valve arrangement when said safety valve arrangement is not provided with an additional helical spring.

DETAILED DESCRIPTION OF THE INVENTION

Figure 1:
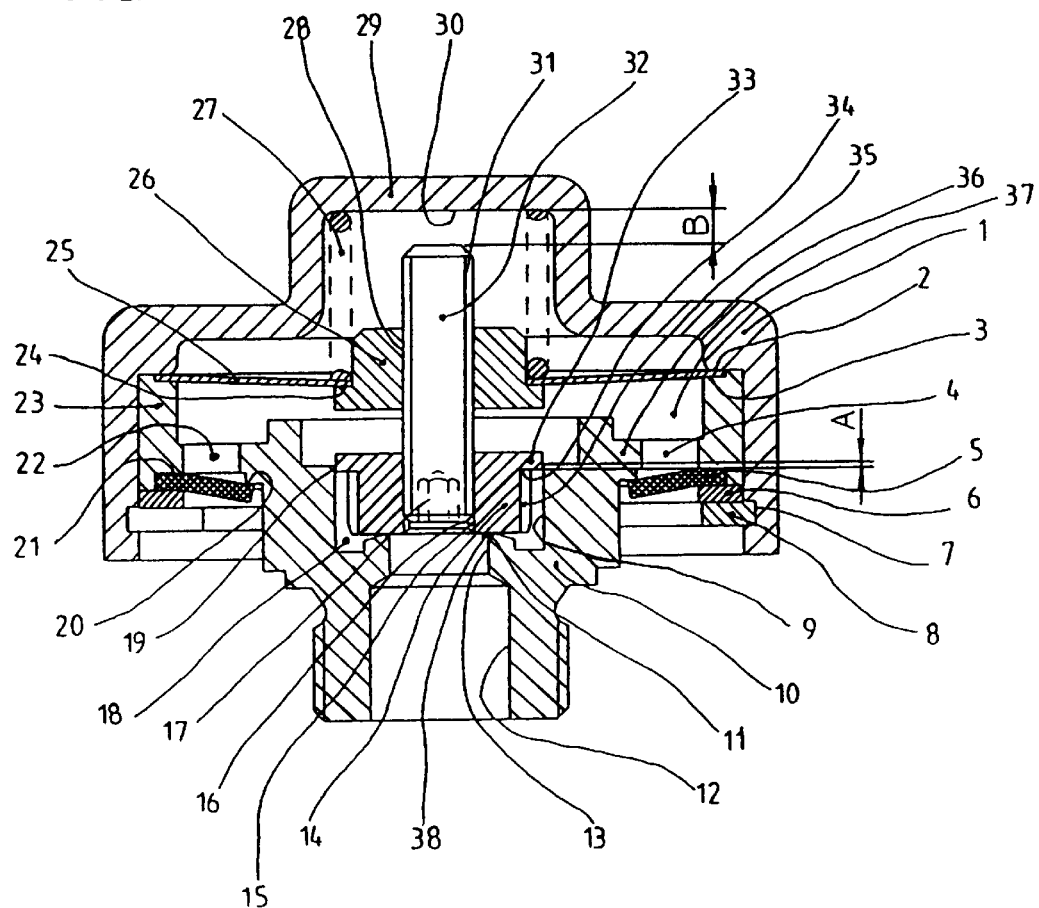
FIG. 1 shows a safety valve arrangement with a valve and an auxiliary valve as well as with a double valve closing element which is subjected to the force of a Belleville spring washer and an additional helical spring.

A safety valve arrangement shown in FIG. 1 comprises a first housing element (10, 36, 23) which is rotationally-symmetrical, stepped, and is in the form of a valve base body. A second housing element (1, 29) in the shape of pot is also provided. The first housing element (10, 36, 23) and the second pot-shaped housing element (1, 29) together constitute the housing (10, 36, 23, 1, 29) of the safety valve arrangement.

The first housing element (10, 36, 23) includes a ring-shaped projection (23) located in the zone of its greatest diameter, on its outside circumference and extending in the direction of the longitudinal axis of the first housing element (10, 36, 23). The first housing element (10, 36, 23) is inserted into the pot-shaped second housing element (1, 29) so that it presses the face of its ring-shaped projection (23) towards the second housing element (1, 29) against a step (2) of the second housing element (1, 29). The first housing element (10, 36, 23) is held in the pot-shaped second housing element (1, 29) by a securing ring (8) such as a snap ring. The securing ring (8) is inserted on the side of the first housing element (10, 36, 23) away from the step (2) of the second housing element (1, 29) in a surrounding groove (7) of the second housing element (1, 29) by means of a spacer ring (6). The spacer ring (6) is located between the securing ring (8) and the ring-shaped projection (23) of the first housing element (10, 36, 23). The securing ring (8) and spacer ring (6) secure the first housing element (10, 36, 23) against possible shifting in the direction of its longitudinal axis relative to the second housing element (1, 29).

On its side away from the second housing element (1, 29), the first housing element (10, 36, 23) constitutes a dome-like extension (10) which extends in the direction of the longitudinal axis of the housing (10, 36, 23, 1, 29). The dome-like extension is designed as a connection piece for a pressure medium line on its free end zone. The dome-like extension (10) is coaxial with the ring-shaped projection (23) of the first housing element (10, 36, 23) and is located on the first housing element (10, 36, 23). The dome-like extension possesses a stepped central bore (9, 13, 12) that extends in the direction of the longitudinal axis of the first housing element (10, 36, 23) and goes through said first housing element (10, 36, 23).

The first zone (9) of the bore (9, 13, 12) which follows the interior of the housing (10, 36, 23, 1, 29) has a greater diameter than the central second zone of the bore (9, 13, 12). The central second zone of the bore (9, 13, 12) constitutes a pressure medium input chamber (13). The third zone of the bore (9, 13, 12) is located in the connection piece that follows the pressure medium input chamber (13) and constitutes a pressure medium output chamber (12).

The central second zone of the bore (9, 13, 12) which serves as the pressure medium input chamber (13) is delimited on its side facing the housing interior by a ring-shaped projection. The ring-shaped projection extends in the direction of the housing interior and is designed to function as a valve seat (11) for a valve (11, 14). This is the main valve of the safety valve arrangement.

A stepped body (14, 33) constitutes a valve closing element (14) for the valve (11, 14) and a valve closing element (33) for an auxiliary valve (19, 33) is coaxial with the stepped bore (9, 13, 12). The stepped body (14, 33) can be moved along the direction of the longitudinal axis of the stepped bore (9, 13, 12), either towards or away from the valve (11) in the housing (10, 36, 23, 1, 29). Preferably, the stepped body (14, 33) is rotationally symmetrical.

The valve closing element (14) is provided with a first active surface (38) which can be subjected to the force of the pressure medium in the opening direction of the valve (11, 14). The valve closing element (14) is also provided with a second active surface (34) which can also be subjected to the force of the pressure medium in the opening direction of the valve (11, 14). The first active surface (38) is formed by the area of the valve closing element (14) that is delimited by the valve seat (11). The second active surface (34) is located outside the area of the valve closing element (14) delimited by the valve seat (11) and is formed by the side of the step of the valve closing element (14) in the direction of the valve seat (11).

The second active surface (34) of this embodiment also contains the ring-shaped area of the valve closing element (14) that directly adjoins the first active surface (38) and is located outside the area delimited by the valve seat (11) of the valve closing element (14). The second active surface (34) is in the same plane of the valve closing element (14) as the first active surface (38).

The zone of the stepped body (14, 33) having the greater diameter located on the side of the stepped body facing away from the valve seat (11) constitutes, as mentioned earlier, the valve closing element (33) of the auxiliary valve (19, 33). The zone with the smaller diameter of the stepped body constitutes the valve closing element (14) of valve (11, 14). As mentioned earlier, the side facing the valve seat (11) of the ring-shaped area of the valve closing element (33) of the auxiliary valve (19, 33) extends beyond the valve (11, 14) at a right angle to the longitudinal axis of the valve closing element (14) of the valve (11, 14). This axial extension serves as the second active surface (34) of the valve closing element (14) of the valve (11, 14).

The axial extension of the valve closing elements (14 and 33) together form one component. The axial extension of the first zone (9) of the bore (9, 13, 12) is sized so that the valve closing element (14) of the valve (11, 14) is submerged completely into the bore (9, 13, 12). In this orientation, the valve closing element (33) axial extension of the auxiliary valve (19, 33) is at least partially submerged in the first zone (9) of the bore (9, 13, 12). The diameter of the valve closing element (33) of the auxiliary valve (19, 33) together with the diameter of the first zone (9) of the bore (9, 13, 12) are selected so that the valve closing element (33) of the auxiliary valve (19, 33) may move slidably within zone (9) of the bore (9, 13, 12).

The valve closing element (14) of the valve (11, 14) has a circumferential recesses (35) extending along the longitudinal axis of the valve closing element (9) of bore (9, 13, 12). The circumferential recesses (35) have the shape of circular cut-outs. The recesses (35) extend from the face of the valve closing element (14) towards the valve (11, 14) in the direction of the auxiliary valve (19, 33) valve closing element (33) with the greater diameter and terminate at the side of the valve closing element (33) of the auxiliary valve (19, 33) serving as the second auxiliary surface (34) of the valve closing element (14). Since the component (14, 33) is stepped, a space (18) is formed which may be connected to the interior portion of the housing that serves as the pressure medium output chamber (37) by the auxiliary valve (19, 33). The free end area of the side which delimits the zone (9) of the bore (9, 13, 12) serves as a control edge (19) for the auxiliary valve (19, 33) of the safety valve arrangement and acts as a sliding valve.

The distance between the valve seat (11) of the valve (11, 14), the control edge (19) of the auxiliary valve (19, 33), the axial extension of the valve closing element (14) of the valve (11, 14) and the valve closing element (33) of the auxiliary valve (19, 33) which serves as a valve slide are demensioned so that the auxiliary valve (19, 33) remains closed during an opening process of the valve (11, 14) and auxiliary valve (19, 33). The auxiliary valve (19, 33) remains closed during an opening process of the valve (11, 14) and auxiliary valve (19, 33) until the valve closing elements (14, 33) of the valve (11, 14) and auxiliary valve (19, 33) have covered a distance (A).

The valve closing elements (14 and 33) together are combined into a double valve body and are provided with a passage bore (16) having threads (15) which extend in the direction of the longitudinal axis of the valve closing elements (14). A rod-like part forms an adjustable stop (32) having threads (31) and is screwed into the threads (15) of the passage bore (16). When the valve closing elements (14, 33) are moved in the opening direction of the two valves (11, 14 and 19, 33), the stop (32) moves towards a dome-like part (29) of the second housing element (1, 29). The movement continues towards the dome-like part (29) until the face of stop (32) presses against a contact surface (30) of the dome-like part (29).

Another rotationally symmetrical part (26) having a threaded bore (28) is centered and extends along the longitudinal axis. The symmetrical part (26) is screwed onto the rod-like part serving as a stop (32). This rotationally symmetrical part (26) is positioned on the rod-like part serving as a stop (32) between the valve closing element (33) and the portion of the second housing element (1, 29) facing it.

A first spring arrangement in the form of a Belleville spring washer (25) is held by its outer edge between a step (3) of the ring-shaped projection (23) of the first housing element (10, 36, 23) and the shoulder (2) of the second housing element (1, 29). An inner edge of the first spring arrangement (25) lies on a surrounding projection (24) of the second rotationally symmetrical part (26) and extends radially away from the rotationally symmetrical part (26). The Belleville spring washer (25) is attached to the housing (10, 36, 23, 1, 29) relative to the valve closing elements (14, 33) in such a manner as to hold the valve closing element (14) on the valve seat (11) of the valve (11, 14) with a predetermined force. When the valve closing element (14) is in this position, the auxiliary valve (19, 33) is also closed.

A second spring arrangement in the form of a helical spring (27) is also positioned within the safety valve arrangement. The helical spring (27) is positioned so that one of its ends rests on the contact surface (30) of the second housing element (1, 29), and its other end bears on the second rotationally symmetrical part (26) in the closing direction of the valve (11, 14) and the auxiliary valve (19, 33).

The face of the rod-like stop (32) is positioned towards the pressure medium input chamber (13) and has a recess (17), e.g., in hexagonal form, into which a tool can be inserted to rotate the stop (32) around the longitudinal axis. Rotating the stop (32) around its longitudinal axis adjusts the distance (B) between the contact surface (30) of the second housing element (1, 29) and the face of the stop (32).

A disk shaped area (36) of the first housing element (10, 36, 23) located between the dome-like extension (10) and the ring-shaped projection (23) of the first housing element (10, 36, 23) has several bores. These bores serve as pressure medium outlets (4 and 22) for both the valve (11, 14) and the auxiliary valve (19, 33). A ring (5) is provided on the side of the first housing element (10, 36, 23) opposite the housing interior. This ring (5) serves as a seal and is made of an elastically deformable material such as rubber or plastic. The ring (5) covers several of the bores. The ring (5) and the pressure medium outlets (4, 22) interact in a manner similar to that of check valves which are capable of being moved away from the housing interior into an open position.

The ring (5) is held by its outer edge between a step (21) of the ring-like projection (23) of the first housing element (10, 36, 23) and the securing ring (6). The ring (5) extends in a radial direction towards the dome-like extension (10) of the first housing element (10, 36, 23), whereby its inner edge comes into contact with a contact surface (20) in the area of the pressure medium outlets (4, 22) of the first housing element (10, 36, 23).

Figure 2:
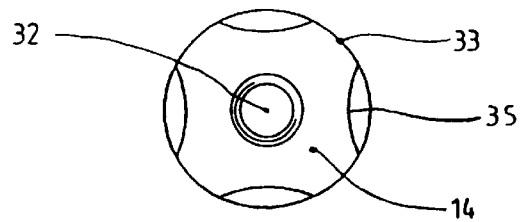
FIG. 2 shows the double valve closing element of the safety valve arrangement according to FIG. 1 in cross-section.

FIG. 2 shows the component of the safety valve arrangement comprising the valve closing element (14) of the valve (11, 14) and the valve closing element (33) of the auxiliary valve (19, 33) in such manner that its end facing towards the valve seat (11) can be seen. The stop (32) is screwed into the threaded bore. The valve closing element (14) is provided with recesses (35) in the form of circular cut-outs that extend in the direction of its longitudinal axis.

Figure 3:
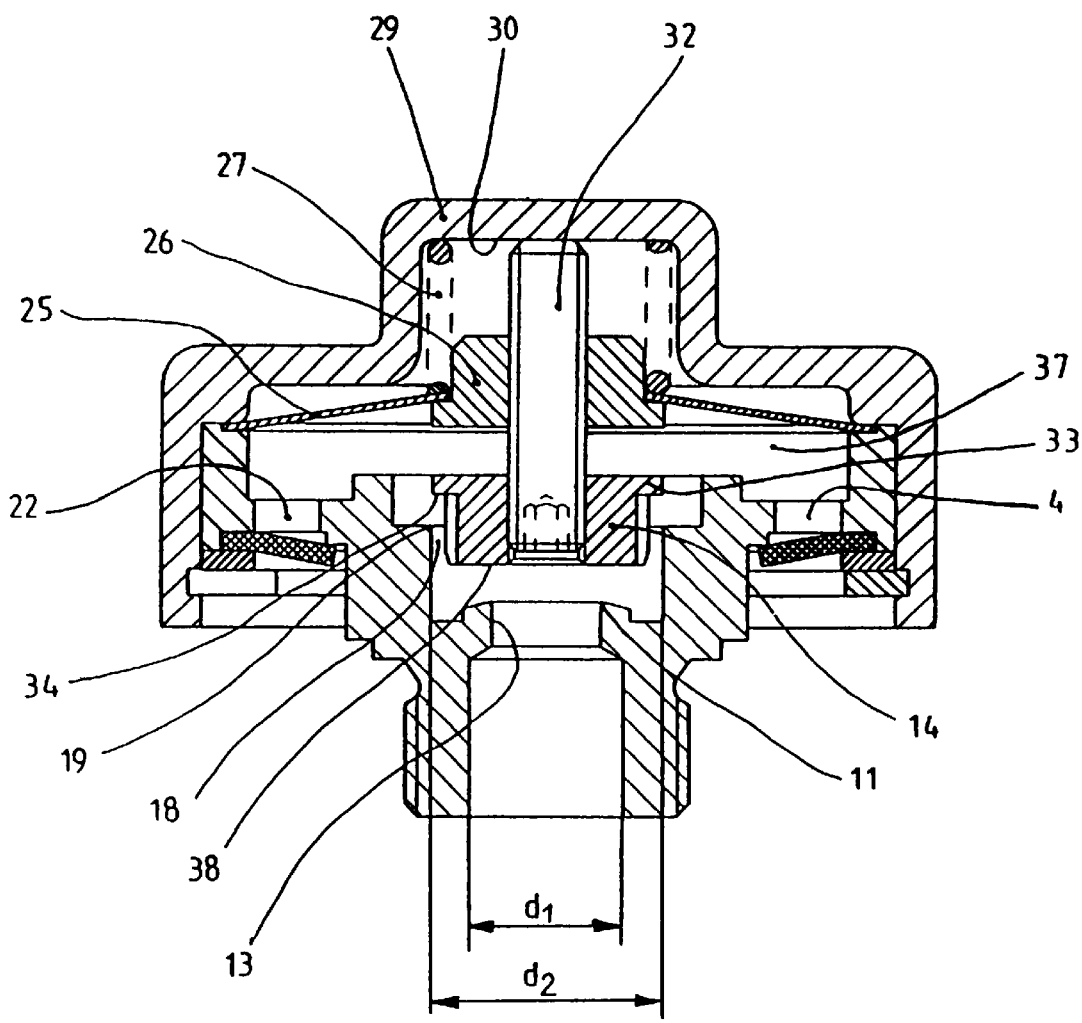
FIG. 3 shows a safety valve arrangement according to FIG. 1 in which the valve and the auxiliary valve are in their open positions.

The safety valve arrangement shown in FIG. 3 is identical to the safety valve arrangement shown in FIG. 1, except that both the valve (11,14) and auxiliary valve (19, 33) are completely open in FIG. 3, while both the valve (11, 14) and the auxiliary valve (19, 33) are completely closed in FIG. 1. Accordingly, the description of FIG. 3 is the same as the description of FIG. 1 discussed above. For the sake of greater clarity, the components shown in FIG. 3 are given the same reference numbers as the components shown in FIG. 1.

The functioning of the above-described safety valve arrangement is described in further detail below through FIGS. 1 and 3, and in connection with a spring force diagram shown in FIG. 6.

For purposes of the following description, it is assumed that the safety valve arrangement is installed in a pressure medium supply installation having a compressor and a compressed-air supply container directly attached to the compressor. In particular, the pressure chamber of the compressor is attached to the pressure medium input (12) of the safety valve arrangement. The safety valve arrangement connects the pressure chamber of the compressor, or in the alternative the pressure medium line going from the compressor to the compressed-air supply container, to the atmosphere so that, in the event that an extremely high pressure occurs in the compressed-air supply installation, the excess pressure will be released into the atmosphere via the safety valve arrangement.

Compressed air produced by the compressor flows through the pressure medium line to the compressed-air supply container and from the compressed-air supply container through the pressure medium input (12) of the safety valve arrangement into the pressure medium input chamber (13) of the valve (11, 14) of the safety valve arrangement. The compressed air acts upon the first active surface (38) of the valve closing element (14) which is delimited by the valve seat (11). The valve (11, 14) as well as the auxiliary valve (19, 33) located between the valve (11, 14) and the pressure medium outlets (4, 22) of the safety valve arrangement are in their closed position as shown in FIG. 1.

When the pressure in the pressure chamber of the compressor, and the pressure medium line increases, the force of the pressure exerted upon the first active surface (38) of the valve closing element (14) also increases.

As long as the level of pressure in the pressure chamber of the compressor, and the pressure medium line, does not exceed a predetermined value, both the valve (11, 14) and the auxiliary valve (19, 33) remain in their closed positions.

If deposits form in the pressure medium line due to organic oil residues, a decrease of the cross-section passage of the pressure medium line is experienced. As a result, dynamic pressure is produced both in the pressure chamber of the compressor and the segment of the pressure medium line which is located between the pressure chamber of the compressor and the narrowed area in the pressure medium line. A compressor continues to operate the pressure in the pressure chamber of the compressor, the segment of the pressure medium line affected by the narrowing passageway, and the pressure medium input chamber (13) of the safety valve arrangement continues to increase.

If the pressure has increased so that the force exerted directly upon the valve closing element (14) of the valve (11, 14) via the first active surface (38) of the valve closing element (14) and indirectly upon the valve closing element (33) of the auxiliary valve (19, 33) exceeds the opposing force (R) exerted upon the valve closing elements (14 and 33) by the Belleville spring washer (25) and the helical spring (27), the valve closing element (14) is lifted by the force of the pressure from the valve seat (11) of the valve (11, 14) of the safety valve arrangement. The force of the helical spring (27) increases steadily during the above-described process. This steady increase occurs according to the characteristic line (S) of helical spring (27) in the spring force diagram of FIG. 6 which plots spring force F vs. compression distance S. The force on the Belleville spring washer (25) increases as the stroke of the valve closing element (14) progresses against it. This force increase occurs according to the characteristic line (T) shown in the spring force diagram of FIG. 6. The resulting force from the combination of both the Belleville spring washer (25) and the helical spring (27) acts upon the valve closing element (14), and is shown as the characteristic line (R) in the spring force diagram of FIG. 6.

Figure 6:
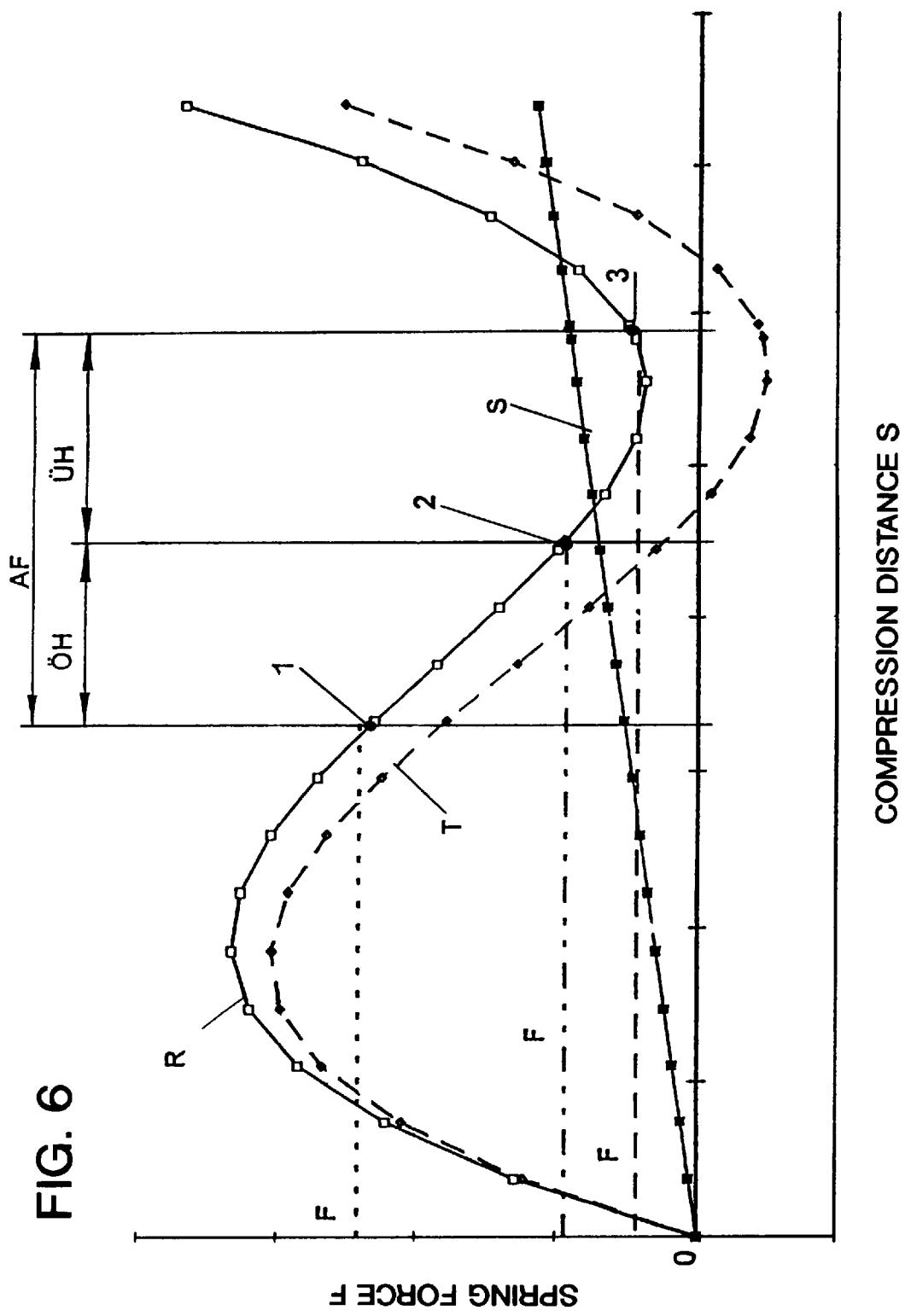
FIG. 6 shows a spring-force diagram of the course of the force of the Belleville spring washer and of the helical spring during the opening and the closing process of the two valves of the safety valve arrangement.

In FIG. 6, at point (1) of characteristic line (R), which corresponds with a declining region of the characteristic line (T) of the Belleville spring washer (25), the opening stroke (ÖH) of the Belleville spring washer (25) begins at the same time as the opening stroke of the valve closing element (14) of the main valve (11, 14) begins. In this phase of the opening process of the safety valve arrangement, the auxiliary valve (19, 33) of the safety valve arrangement remains closed.

Referring to FIG. 3, the compressed air from the pressure medium input chamber (13) now flows through the narrowed cross-sectional passage of the valve (11, 14) and into the space (18). Once in the space (18), it acts upon the second active surface (34) of the valve closing element (14) of the valve (11, 14) which is formed by the valve closing element (33) of the auxiliary valve (19, 33). In this space (18) dynamic pressure is produced. The first active surface (38) of the valve closing element (14) subjected to the compressed air becomes enlarged by both the circular surface of the valve closing element (14) located outside the valve seat (11) and the second active surface (34). Thus, the force exerted by the compressed air on the valve closing element becomes greater, so that the resulting force from the Belleville spring washer (25) and the helical spring (27) acting in an opposite direction upon the valve closing element (14) is quickly overcome. As a result, the valve closing element (14) moves away from the valve seat (11) and traverses the distance (A) (shown in FIG. 1). The step of the valve closing element (14) serves as valve closing element (33) of the auxiliary valve (19, 33), the distance (A) being equal to the opening stroke of the auxiliary valve (19, 33). When point (2) shown on the characteristic line (R) of FIG. 6 is reached, the force resulting from the two springs (25 and 27) is realized. At this point, the lower edge of the step serving as the valve closing element (33) has passed the control edge (19) of the auxiliary valve (19, 33) and the opening stroke of the auxiliary valve (19, 33) begins.

The opening stroke of the valve closing element (33) of the auxiliary valve (19, 33) is equal to the overstroke (ÜH) of the Belleville spring washer (25) shown in the spring force diagram of FIG. 6.

The opening stroke of the valve closing element (33) of the auxiliary valve (19, 33), (which is indicated on the characteristic line (R) of the spring force diagram of FIG. 6 as point (3)), is completed when the adjustable stop (32) of the valve closing element (14) comes into contact with the contact surface (30) of the housing element (10, 36, 23, 1, 29) as shown in FIG. 3. The safety valve arrangement is then completely open. At this time, the compressed air is able to flow from the pressure chamber of the compressor to the compressed-air line, to the completely open valve (11, 14), to the space (18), to the open auxiliary valve (19, 33), to the pressure medium output chamber (37), through the pressure medium outlets (4, 22) of the safety valve arrangement, and finally into the atmosphere (FIG. 3).

The cross-sections of both the valve (11, 14) and the auxiliary valve (19, 33) are preferably sized so that when the valve (11, 14) and the auxiliary valve (19, 33) are completely open, the pressure medium flows through in a throttled manner so that in case of pressure fluctuations the open position is maintained.

The throttling of the pressure medium flow can be achieved by sizing the diameter of the valve closing element (14) of the valve (11, 14) so that only a relatively small annular gap remains between the casing surface of the valve closing element (14) of the valve (11, 14) and the side which delimits the zone (9) containing the valve closing element (14).

The Belleville spring washer (25), as mentioned earlier, is designed and positioned relative to either the valve closing elements (14 and 33) or to one of the components (rotationally symmetrical part 26) in active connection with the valve closing elements (14 and 33), so that the opening stroke of the valve (11, 14) begins when the characteristic spring force line of the Belleville spring washer (25) is in its negative zone. (See point (1) on the characteristic line (R) in FIG. 6.) The opening stroke of the auxiliary valve (19, 33) also begins in the negative zone of the characteristic spring force line of the Belleville spring washer (25), but only in the zone of the over-stroke (ÖH) of the Belleville spring washer (25) which corresponds to point (2) on the characteristic line (R) in FIG. 6. The opening strokes of both the valve closing element (14) of the valve (11, 14) and the valve closing element (33) of the auxiliary valve (19, 33) terminate when the stop (32) of the valve closing elements (14, 33) comes into contact with contact surface (30). This corresponds to point (3) on the characteristic line (R) of FIG. 6. The operating range of the Belleville spring washer (25) is identified in the spring force diagram of FIG. 6 as (AF).

If the pressure in both the pressure medium line and the pressure chamber of the compressor drops to a level in which the force exerted on the valve closing elements (14 and 33) becomes less than the force of the helical spring (27) exerted in opposition to the force on the valve closing elements (14 and 33), the valve closing elements (14 and 33) are displaced by the direction of the valve seat (11) of the valve (11, 14) by the helical spring (27). As soon as the Belleville spring washer (25) returns into its positive zone as shown on characteristic line (R) of FIG. 6, the valve closing elements (14, 33) are moved in the direction of the valve seat (11) at an accelerated pace by means of the Belleville spring washer (25). Thus, first the auxiliary valve (19, 33) and then the valve (11, 14) reach their closed position.

By providing the safety valve arrangement with an auxiliary valve (19, 33), as well as an additional active surface (34) at the valve closing element (14) of the valve (11, 14) which is subjected to compressed air from the pressure chamber of the compressor only when the valve (11, 14) is open, one ensures that the valve closing element (14) of the valve (11, 14) does not react to pulsations of the compressed air in the pressure medium line by immediately going into its closed position.

Figure 4:
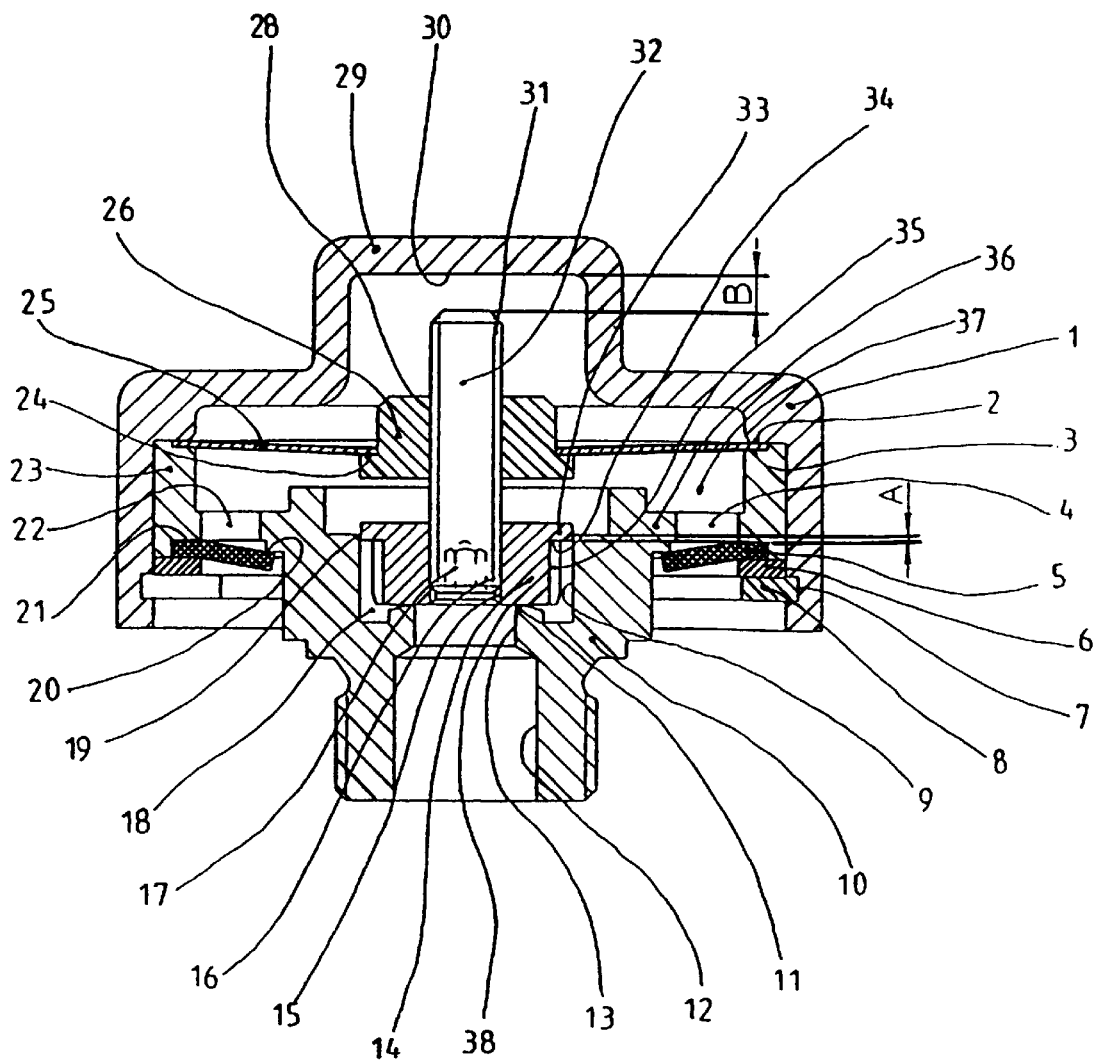
FIG. 4 shows a safety valve arrangement according to FIG. 1, in which the double valve closing element is subjected to the force of a Belleville spring washer.

FIG. 4 shows a safety valve arrangement similar that of FIGS. 1 and 3 except that it is not provided with a second helical spring. The Belleville spring washer (25) is designed and sized so that it automatically brings the valve closing elements (14, 33) into the closing position of both the valve and the auxiliary valve (19) following an opening stroke.

For the sake of greater clarity, all components of the safety valve arrangement of FIG. 4 which are the same as the components of the safety valve arrangement shown in FIGS. 1 and 3 are given the same reference numbers.

The characteristic spring force line of the Belleville spring washer (25) used in the safety valve arrangement of FIG. 4 is shown in the spring force diagram of FIG. 7.

As shown in the spring force diagram of FIG. 7, the opening stroke (ÖH) of the valve (11, 14) of the safety valve arrangement begins in the declining region of the characteristic spring force line at point (1) and terminates at point (2) of same line. The valve closing element (14) of the valve (11, 14) carries out an over-stroke (ÜH) in opening direction between points (2) and point (3) of the characteristic spring force line. Within this over-stroke range, the auxiliary valve (19, 33) of the safety valve arrangement also opens, after covering distance (A). The opening stroke of both the valve closing element (14) of the valve (11, 14) and the valve closing element (33) of the auxiliary valve (19, 33) terminates when the stop (32) of the valve closing elements (14, 33) makes contact with the contact surface (30). This movement corresponds to point (3) on the characteristic spring force line of FIG. 7. The opening process of both the valve (11, 14) and the auxiliary valve (19, 33) is further accelerated when the second active surface (34) of the valve closing element (14) is subjected to the force of the pressure accumulating in space (18). The operating range of the Belleville spring washer (25) is identified by the reference (AF) in the spring force diagram of FIG. 7.

Since the only difference between the safety valve arrangement of FIG. 4 and the safety valve arrangement of FIGS. 1 and 3 is the fact that the former safety valve arrangement has no second spring arrangement, a further description of the safety valve arrangement of FIG. 4 can be omitted.

Figure 5:
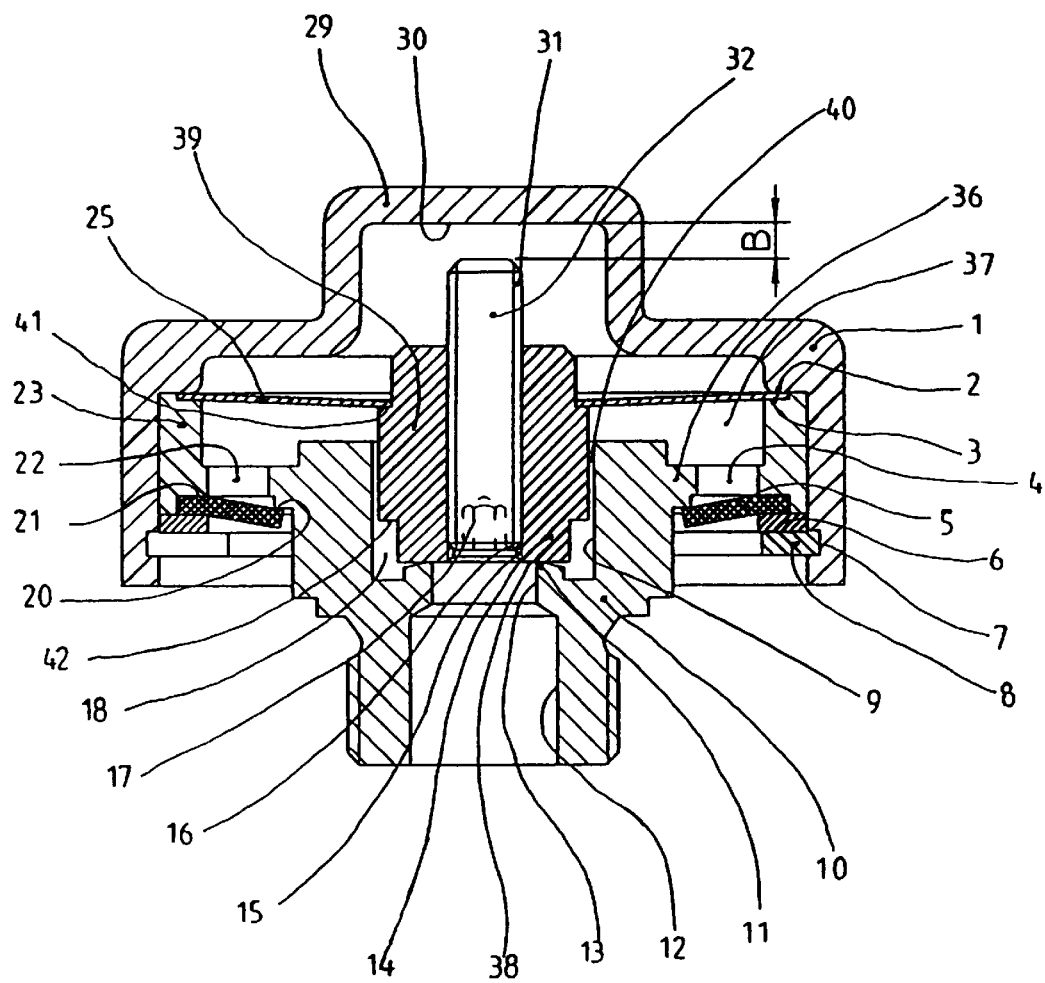
FIG. 5 shows a safety valve arrangement having a choke provided between the valve and the pressure medium output.

FIG. 5 shows a safety valve arrangement with only one valve. The valve is provided with a choke arrangement to throttle the pace of the out-flowing pressure medium.

Since the only difference between the safety valve arrangement shown in FIG. 5 and those shown in FIGS. 1, 3, and 4 is that the auxiliary valve of FIGS. 1, 3, and 4 was replaced by a choke arrangement, the identical components are given the same reference numbers. In the following description of the safety valve arrangement, only the components not yet described are discussed in further detail.

The valve closing element (14) is attached to the housing (10, 36, 23, 1, 29) coaxially with the bore (9, 13, 12) located in the first housing element (10, 36, 23). The valve closing element (14) is made in the form of a stepped, rotationally symmetrical part whose smaller diameter end is oriented towards the ring-shaped valve seat (11). The Belleville spring washer (25) is held by its outer edge between the ring-shaped projection (23) of the first housing element (10, 36, 23) and the shoulder (2) of the pot-shaped second housing element (1, 29). The Belleville spring washer (25) lies with its inner edge on a step (41) of the sleeve of the valve closing element (14) and is positioned relative to both the valve closing element (14) and the valve (11, 14) so that it holds the valve closing element (14) on the valve seat (11) with a pre-determined force.

Both the size and the stepping of the axial extension of the valve closing element (14) are selected so that the region of the valve closing element (14) with the smallest diameter is submerged completely into bore (9) and the portion of the valve closing element (14) with the largest diameter and serving as a choke body (39) is at least partially submerged with at least part of its axial extension in the first zone (9) with the larger diameter of the bore (9, 13, 12). The portion of the valve closing element (14) serving as a choke body (39) is located on the side of the valve closing element (14) facing away from the valve seat (11), between the valve (11, 14) and the pressure medium outlets (4, 22) of the safety valve arrangement. The diameter of the first portion of bore (9) and the outside diameter of the choke body (39) are selected so that between the outer sleeve surface of the choke body (39) and the wall delimiting the first portion of bore (9) with the larger diameter of the bore (9, 13, 12), an annular gap is created. The annular gap serves as a choke (40). Choke (40) controls the flow of the pressure medium from the pressure medium input (12) to the pressure medium output (4, 22) when the valve (11, 14) is open.

The second portion of bore (9) having the smaller diameter is located between the portion serving as the pressure medium input (12) and the first portion of bore (9) with the larger diameter of the bore (9, 13, 12). This portion of bore (9) serves as the pressure medium input chamber (13) of the safety valve arrangement.

Because the valve closing element (14) is stepped, both the step of the valve closing element (14) and of the valve (11, 14) constitute the space (19). Space (19) is constantly connected to the portion of the housing interior serving as pressure medium output chamber (37) by choke (40).

The valve closing element (14) is provided with both a first active surface (38) and a second active surface (42) which can be subjected to the force of the pressure medium in the opening direction of the valve (11, 14). The first active surface (38) is formed by the zone of the valve closing element (14) which is delimited by the valve seat (11). The second active surface (42) is located outside the zone of the valve closing element (14) and is is delimited by the valve seat (11) on the valve closing element (14). The second active surface (42) is formed by the side of the step of the valve closing element (14) facing the valve seat (11). In this embodiment the second active surface (42) also comprises a ring-shaped zone of the valve closing element (14) which is directly attached to the first active surface (38) located outside the zone of the valve closing element (14) and delimited by the valve seat (11). The second active surface (42) is in the same plane of the valve closing element (14) as the first active surface (38).

The zone with the larger diameter of the stepped valve closing element (14) located on the same side of the stepped valve closing element (14) away from the valve seat (11) constitutes the choke body (39) as mentioned previously. The side of the ring-shaped zone of the choke body (39) facing the valve seat (11) which is perpendicular to the longitudinal axis of the valve closing element (14) of the valve (11, 14) and extends beyond the same, serves as a second active surface (42) of the valve closing element (14) of the valve (11, 14).

The second active surface (42) is subjected to the force of the pressure medium only when the valve closing element (14) is lifted from the valve seat (11) of the valve (11, 14).

The operation of the above-described safety valve arrangement is explained in further detail below.

As in the previous examples, it is assumed that the safety valve arrangement is located in a compressed-air supply installation which comprises a compressor and a compressed-air supply container. The compressed-air supply container is either directly attached to the compressor or in proximity to the compressor. The pressure medium input (12) of the safety valve arrangement is connected directly to the pressure chamber of the compressor or to the pressure chamber via the pressure medium line. When the compressor is in operation, compressed air produced by the compressor flows through the pressure medium line to the compressed-air supply container and from the compressed-air supply controller to the pressure medium input chamber (13) via the pressure medium input (12) of the safety valve arrangement. Once in the pressure medium input chamber (13), the compressed-air acts upon the first active surface of the valve closing element (14). The valve (11, 14) of the safety valve arrangement is in its closed position as shown in FIG. 5.

When the pressure in both the pressure chamber of the condenser and the pressure medium line increases, the force of the pressure in the pressure medium input chamber (13) of the valve (11, 14) acting via the first active surface (38) of the valve closing element (14) upon the valve closing element (14) also increases. As long as the level of pressure in both the pressure chamber of the compressor and pressure medium line has not reached or exceeded a predetermined value, the valve (11, 14) remains in its closed position.

If organic deposits form in the pressure medium line, i.e., due to organic oil residues, a reduction in the cross-section of the passage of the pressure medium line results. This reduction of the passage cross-section causes a reduction in the dynamic pressure that occurs in both the pressure chamber of the compressor and the segment of the pressure medium line which is located between the pressure chamber of the compressor and the narrowed area of the pressure medium line. When the compressor is operating, the pressure in the pressure chamber of the compressor, the segment of the pressure medium line affected by the narrowing, and the pressure medium input chamber (13) of the safety valve arrangement continues to increase.

When the pressure has increased to such an extent that its force exerted upon the valve closing element (14) of the valve (11, 14) exceeds the force of the Belleville spring washer (25) exerted upon the valve closing element (14) in opposite direction, the valve closing element (14) is lifted from the seat (11) of the valve (11, 14). Compressed air from the pressure medium input chamber (13) flows through the residue-reduced passage cross-section of the valve (11, 14) into the space (18) and acts upon the second active surface (42) of the valve closing element (14). Compressed air goes through the passage of the choke (40) in a choked condition from space (18) into the pressure medium output chamber (37) and acts upon the elastic ring (5) of the check valves (4, 22, 5). The ring (5) is lifted by the compressed air from the sealing surface (20) and the compressed air flows through the now open check valves (4, 22, 5) into the atmosphere.

However, due to the choke (40), the compressed air coming from the pressure medium input (12) cannot flow as rapidly as it builds up in space (18). If pressure fluctuations occur in the pressure medium line, which would normally result in a closing of the valve (11, 14) of the safety valve arrangement, the pressure fluctuations are not able to negatively influence the opening process of the valve (11, 14) because the dynamic pressure in the space (18) cannot drop fast enough so that a brief lowering of the pressure in the pressure medium input chamber (13) would result in a closing of the valve (11, 14). As the pressure builds up in both the pressure medium input (12) and the space (18), the valve closing element (14) suddenly shifts into its second end position in which the valve (11, 14) is completely open. This is due to both the formation of dynamic pressure in space (18) and to the second active surface (42) coming into contact with its stop (32) upon the contact surface (30) of the housing (10, 36, 23, 1, 29). The effect of the choke (40) is also maintained in this case. As can be seen in the spring force diagram of FIG. 7, the opening stroke of the valve (11, 14) of the safety valve arrangement begins at point (1) in the declining region of the characteristic spring force line and ends at point (2) of the characteristic spring force line. In the range from point (2) to point (3), the valve closing element (14) of the valve (11, 14) carries out an overstroke in opening direction of the valve (11, 14).

If the pressure in both the pressure medium line and the compression chamber of the compressor drops to a level in which the force exerted upon the valve closing element (14) becomes less than the opposing force exerted upon the valve closing element (14) by the Belleville spring washer (25), the valve closing element (14) is pushed by the Belleville spring washer (25) in the direction of the valve seat (11) of the valve (11, 14). At this point, the valve (11, 14) returns into its closed position.

As shown in FIG. 5, the valve closing element (14) and the choke body (39) can be made as a one-piece component. However, they can also be made as two separate components which are connected to each other via a connecting element such as a the rod-like part serving as stop (32).

In the same manner, the valve closing element (14) of the valve (11, 14) and the valve closing element (33) of the auxiliary valve (19, 33) of the safety valve arrangement shown in FIGS. 1 to 4 can be made as two separate components which are connected to each other via a connecting element such as a rod-like part serving as stop (32).

The first housing element (10, 36, 23) of the housing (10, 36, 23, 1, 29) which is made in the form of a basic valve body can also be part of the compressor, e.g., the cylinder head.

The stepping of the bore (9, 13, 12) can be in the wall delimiting the bore (9, 13, 12) which is provided with a projection perpendicular to the longitudinal axis of the bore (9, 13, 12) and may extend to the inside which is provided with the valve seat (1). It is of course also possible to make the stepping of the bore (9, 13, 12) by providing a ring-shaped body provided with the valve seat (11) in the bore (9, 13, 12).

The spring arrangement in the form of a Belleville spring washer can of course also be designed and placed so that the actuating pressure of the valve lies within the positive area of the characteristic line of the spring arrangement.

While the invention has been described by reference to specific embodiments, this was for purposes of illustration only. Numerous alternative embodiments will be apparent to those skilled in the art and considered to be within the scope of the invention.

We claim:

1. A safety valve arrangement for an installation operating with a pressure medium, comprising:

a pressure medium input and a pressure medium output;

a valve located between said pressure medium input and said pressure medium output, said valve comprising a valve seat and a valve closing element, said valve closing element being moveable between an open position and a closed position, said valve closing element having an active surface subject to said pressure-medium in the opening direction of said valve, said active surface constituting an area of said valve closing element which is delimited by said valve seat;

said valve closing element further having an auxiliary surface located on an area of said valve closing element outside said area of said valve closing element which is delimited by said valve seat, said auxiliary surface being subject to said pressure medium in the opening direction of said valve only when said valve closing element is lifted from said valve seat;

a spring arrangement holding said valve closing element in a first end position wherein said valve is closed, said valve closing element moving from said first end position to a second end position wherein said valve is open when the force of said pressure medium acting upon said valve closing element is greater than the opposing force of said spring arrangement acting upon said valve closing element;

an auxiliary valve connecting said pressure medium input to said pressure medium output and being moveable from an open position to a closed position, said auxiliary valve having a bore for receiving said pressure medium and a valve closing element positioned so as to control said pressure medium through said bore, said auxiliary valve being located between said valve and said medium output;

said spring arrangement holding said valve closing element of said auxiliary valve in a first end position wherein said auxiliary valve is closed, said auxiliary valve closing element moving from said first end position to a second end position wherein said valve is open when the force of said pressure medium acting upon said valve closing element of said valve is greater than the opposing force of said spring arrangement acting upon said auxiliary valve closing element; and said valve closing element of said valve and said valve closing element of said auxiliary valve being configured so that said auxiliary valve opens later than said valve and said auxiliary valve closes before said valve, wherein said spring arrangement has a force as a function of a distance characteristic curve, a portion of which has a negative slope, and wherein the actuating pressure of said valve occurs along the negatively sloped portion of said curve.

2. The safety valve arrangement of claim 1 wherein said valve closing element of said valve and said valve closing element of said auxiliary valve are integral.

3. The safety valve arrangement of claim 1 wherein said valve closing element of said auxiliary valve constitutes a step of said valve closing element of said valve.

4. The safety valve arrangement of claim 1 wherein said auxiliary valve comprises a sliding valve.

5. The safety valve arrangement of claim 1 wherein said spring arrangement comprises a Belleville spring washer.

6. The safety valve arrangement of claim 1 wherein the cross-section of said valve and the cross-section of said auxiliary valve are demensioned so that said pressure medium is throttled when said valve and said auxiliary valve are completely open.

7. The safety valve arrangement of claim 1 further comprising:

a housing comprising a first housing element and a second housing element;

a stepped bore located in said first housing element and extending in the direction of a longitudinal axis of said first housing element wherein said valve is located;

said bore having a first zone having a diameter which is larger than that of a second zone adjoining said first zone.

8. The safety valve arrangement of claim 7 further comprising, an axial extension of said first zone, said axial extension of said bore being configured so that said valve closing element of said valve is submerged completely in said first zone of said bore, and said valve closing element of said auxiliary valve is at least partially submerged in said first zone of said bore;

said valve closing element of said auxiliary valve has a larger diameter than said valve closing element of said valve and said valve closing element slidably moves in said first zone of said bore; and a free end of a wall delimiting said first zone of said bore comprises a control edge, said control edge together with said valve closing element of said auxiliary valve and said first zone of said bore constitute said auxiliary valve which slidably moves in said first zone of said bore.

9. The safety valve arrangement of claim 8 wherein said first housing element comprises a valve body containing said valve seat of said valve and said control edge of said auxiliary valve, said valve body together with said second housing element constitutes said housing of said safety valve arrangement.

10. The safety valve arrangement of claim 9 wherein said spring arrangement comprises a Belleville spring washer which bears on said valve closing element of said valve, and said valve closing element of said auxiliary valve is held by its outer edge between said first housing element and said second housing element of said housing.

11. The safety valve arrangement of claim 9 wherein said spring arrangement further comprises an additional spring which pushes said valve closing element of said valve in the closing direction of said valve.

12. The safety valve arrangement of claim 8 further comprising a stop attached to said valve closing element wherein said valve closing element interacts with a contact surface located on said housing so that a stroke of said valve closing element of said valve is limited in the direction of its second end position.

13. The safety valve arrangement of claim 8 further comprising a stop having a rod-like shape, said stop being screwed into said bore and extending with its non-threaded end in the direction of said contact surface of said second housing element of said housing;

wherein said valve closing element of said valve has a bore positioned along the longitudinal axis, a wall delimiting said bore having threads over at least part of its axial extension; and said contact surface against which said stop comes into contact is located on said second housing element or on a part connected to said second housing element of said housing.

14. A safety valve arrangement for an installation operating with a pressure medium, comprising:

a pressure medium input and a pressure medium output;

a valve located between said pressure medium input and said pressure medium output, said valve comprising a valve seat and a valve closing element, said valve closing element being moveable between an open position and a closing position, said valve closing element having an active surface subject to said pressure medium in the opening direction of said valve, said active surface constituting an area of said valve closing element which is delimited by said valve seat;

said valve closing element further having an auxiliary surface located on an area of said valve closing element outside the area of said valve closing element which is delimited by said valve seat, said auxiliary surface being subject to said pressure medium in the opening direction of said valve only when said valve closing element is lifted from said valve seat;

a spring arrangement holding said valve closing element in a first end position wherein said valve is closed, said valve closing element moving from said first end position to a second end position wherein said valve is open when the force of said pressure medium acting upon said valve closing element is greater than the opposing force of said spring arrangement acting upon said valve closing element;

a choke located between said valve and said pressure medium output of said safety valve arrangement which throttles the flow of said pressure medium from said pressure medium input to said pressure medium output when said valve is in the open position, wherein said spring arrangement has a force as a function of a distance characteristic curve, a portion of which has a negative slope, and wherein the actuating pressure of said valve occurs along the negatively sloped portion of said curve.

15. The safety valve arrangement of 14 wherein said valve closing element of said valve is connected to a choke body having a diameter greater than the diameter of said valve closing element, said choke body is located on said valve closing element of said valve on a side of said valve closing element away from said valve seat;

said diameter of said choke body and said diameter of said first zone of said bore are demensioned so that between an outer sleeve surface of said choke body and a wall delimiting said first zone of said bore, an annular gap remains which constitutes the choke;

said choke body has a surface which serves as an active surface of said valve closing element and which is placed on said choke body so that the pressure medium coming from said pressure medium input of said safety valve arrangement acts upon it in the opening direction of said valve when said valve is open; and an axial extension of a first zone of a bore is demensioned so that said valve closing element of said valve is completely immersed in said bore, and an axial extension of said choke body is at least partially immersed In said first zone of said bore.

16. The safety valve arrangement of claim 15 wherein:

said valve closing element is stepped, and a first zone of said valve closing element constitutes a choke body;

a step of said valve closing element serves as an active surface of said valve closing element, which is subjected to pressure medium from said pressure medium input of said safety valve arrangement in the opening direction of said valve when said valve is open;

said valve closing element is completely immersed in said first zone and said axial extension of said choke body is at least partially immersed in said first zone of said bore; and said choke remains between an outer sleeve surface of said choke body and said wall which delimits said first zone of said bore containing said choke body.

17. The safety valve arrangement of claim 16 wherein said stepping of said bore has a surrounding projection extending inward at a right angle to a longitudinal axis of said bore which contains said valve seat.

18. The safety valve arrangement of claim 17 wherein said stepping of said bore is in the shape of a ring-shaped body and contains said valve seat.

19. The safety valve arrangement of claim 14 wherein said spring arrangement comprises a Belleville spring washer.

20. The safety valve arrangement of claim 14 wherein said spring arrangement further comprises an additional spring which pushes said valve closing element of said valve in the closing direction of said valve.

21. The safety valve arrangement of claim 14 further comprising a stop attached to said valve closing element so that said valve closing element interacts with a contact surface located on said housing so that a stroke of said valve closing element of said valve is limited in the direction of its second end position.

22. The safety valve arrangement of claim 14 further comprising a stop having a rod-like shape, said stop being screwed into said bore and extending with its non-threaded end in the direction of said contact surface of said second housing element of said housing;

wherein said valve closing element of said valve has a bore positioned along the longitudinal axis, a wall delimiting said bore having threads over at least part of its axial extension and further comprising; and said contact surface against which said stop comes into contact is located on said second housing element or on a part connected to said second housing element of said housing.

23. A safety valve arrangement for an installation operating with a pressure medium, comprising:

a pressure medium input and a pressure medium output;

a valve located between said pressure medium input and said pressure medium output, said valve comprising a valve seat and a valve closing element, said valve closing element being moveable between an open position and a closing position, said valve closing element having an active surface subject to said pressure medium in the opening direction of said valve, said active surface constituting an area of said valve closing element which is delimited by said valve seat;

said valve closing element further having an auxiliary surface located on an area of said valve closing element outside the area of said valve closing element which is delimited by said valve seat, said auxiliary surface being subject to said pressure medium in the opening direction of said valve only when said valve closing element is lifted from said valve seat;

a spring arrangement holding said valve closing element in a first end position wherein said valve is closed, said valve closing element moving from said first end position to a second end position wherein said valve is open when the force of said pressure medium acting upon said valve closing element is greater than the opposing force of said spring arrangement acting upon said valve closing element;

a choke located between said valve and said pressure medium output of said safety valve arrangement which throttles the flow of said pressure medium from said pressure medium input to said pressure medium output when said valve is in the open position, wherein said spring arrangement further comprises an additional spring which pushes said valve closing element of said valve in the closing direction of said valve.

\* \* \* \* \*